(12) United States Patent
Gros et al.

(10) Patent No.: US 8,838,326 B2
(45) Date of Patent: Sep. 16, 2014

(54) METHOD AND DEVICE FOR PROCESSING FAULTS

(75) Inventors: Vincent Gros, Tournefeuille (FR); Frederic Martinez, Pibrac (FR); Jose Dekneudt, Montberon (FR); Arnaud D'Ouince, Grenade (FR)

(73) Assignees: Airbus, Blagnac (FR); Airbus Operations S.A.S., Toulouse (FR)

( * ) Notice: Subject to any disclaimer, the term of this patent is extended or adjusted under 35 U.S.C. 154(b) by 190 days.

(21) Appl. No.: 13/375,592

(22) PCT Filed: Jun. 1, 2010

(86) PCT No.: PCT/FR2010/051067
§ 371 (c)(1),
(2), (4) Date: Dec. 1, 2011

(87) PCT Pub. No.: WO2010/139894
PCT Pub. Date: Dec. 9, 2010

(65) Prior Publication Data
US 2012/0078463 A1  Mar. 29, 2012

(30) Foreign Application Priority Data

Jun. 2, 2009 (FR) ..................................... 09 02641

(51) Int. Cl.
*G07C 5/08* (2006.01)
*G07C 5/00* (2006.01)

(52) U.S. Cl.
CPC .............. *G07C 5/085* (2013.01); *G07C 5/008* (2013.01); *G07C 5/0808* (2013.01)
USPC ...................................... 701/31.4; 701/33.4

(58) Field of Classification Search
CPC ...... G07C 5/008; G07C 5/0808; G07C 5/085; G07C 2205/02; G06Q 10/06

USPC ........................ 701/1, 3, 29, 30, 31.4, 33.4
See application file for complete search history.

(56) References Cited

U.S. PATENT DOCUMENTS 4,964,126 A * 10/1990 Musicus et al. ............... 714/797
5,014,220 A *  5/1991 McMann et al. ............... 706/45
(Continued)

FOREIGN PATENT DOCUMENTS

EP    1 455 313      9/2004
JP    2004-352071   12/2004

OTHER PUBLICATIONS

International Search Report Issued Oct. 21, 2010 in PCT/FR10/051067 Filed Jun. 1, 2010.

(Continued)

*Primary Examiner* — Ian Jen
(74) *Attorney, Agent, or Firm* — Oblon, Spivak, McClelland, Maier & Neustadt, L.L.P.

(57) ABSTRACT

A device for processing faults, that detects and identifies faults, including, for at least part of the identified faults: a mechanism storing a log of occurrences of faults having a same identification, in a course of a plurality of flights; a mechanism determining an impact of each identified fault, on availability of aircraft in a predetermined duration, a mechanism associating a hierarchical attribute with each fault detected in a course of a flight, the hierarchical attribute being dependent on the log and on the impact; and a mechanism displaying identified faults associated with part of the hierarchical attributes. The device enables, in particular, maintenance operations or operations preparatory to maintenance to be better scheduled by virtue of hierarchization of faults displayed.

13 Claims, 2 Drawing Sheets

(56) References Cited

U.S. PATENT DOCUMENTS

Figure 1:
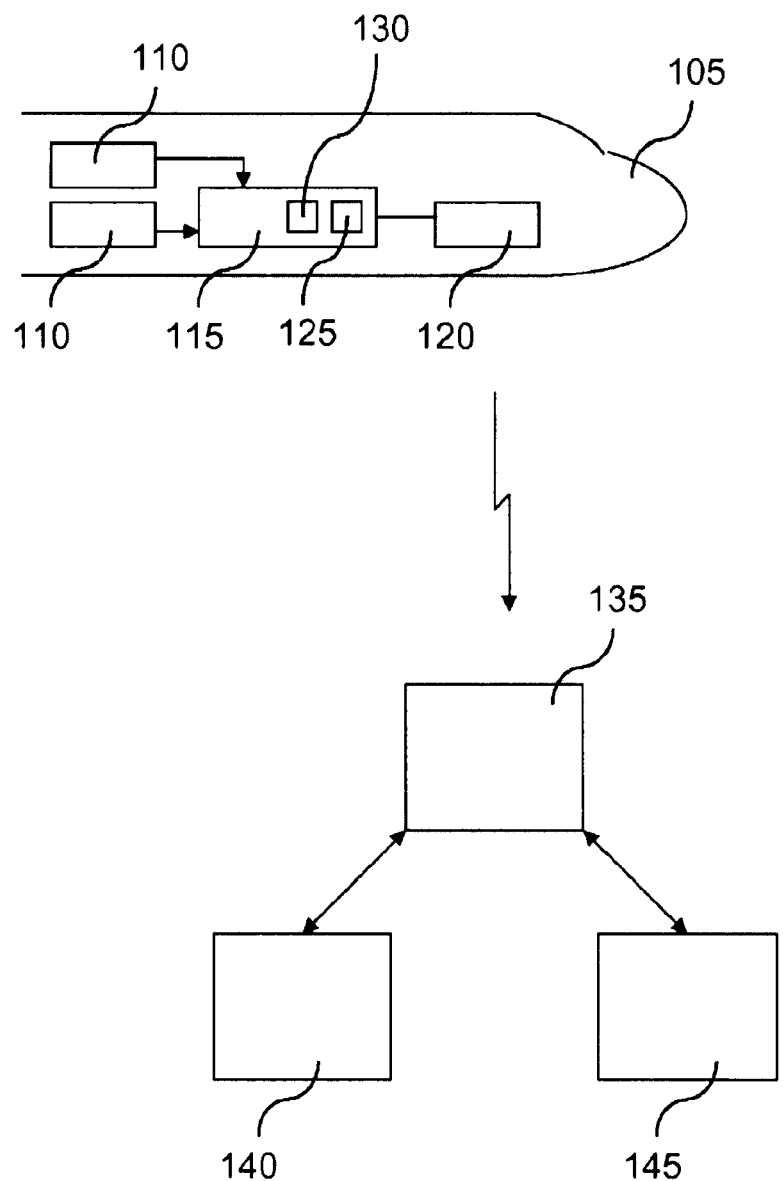

| | | | |
|---|---|---|---|
| 5,034,686 A * | 7/1991 | Aspelin | 324/537 |
| 5,671,141 A * | 9/1997 | Smith et al. | 701/33.6 |
| 5,881,971 A * | 3/1999 | Hickman | 244/1 R |
| 6,208,955 B1 * | 3/2001 | Provan et al. | 703/20 |
| 6,350,239 B1 * | 2/2002 | Ohad et al. | 600/437 |
| 6,662,089 B2 * | 12/2003 | Felke et al. | 701/29.3 |
| 6,735,505 B2 * | 5/2004 | Levine | 701/33.4 |
| 7,719,416 B2 * | 5/2010 | Arms et al. | 340/539.1 |
| 2002/0138230 A1 * | 9/2002 | Faymon et al. | 702/145 |
| 2002/0150068 A1 * | 10/2002 | Orr et al. | 370/335 |
| 2002/0188582 A1 * | 12/2002 | Jannarone et al. | 706/26 |
| 2002/0193920 A1 * | 12/2002 | Miller et al. | 701/29 |
| 2003/0025515 A1 * | 2/2003 | Mulera et al. | 324/713 |
| 2003/0114965 A1 * | 6/2003 | Fiechter et al. | 701/29 |
| 2003/0135311 A1 * | 7/2003 | Levine | 701/35 |
| 2003/0188221 A1 * | 10/2003 | Rasmussen et al. | 714/11 |
| 2003/0195675 A1 | 10/2003 | Felke et al. | |
| 2003/0229471 A1 * | 12/2003 | Guralnik et al. | 702/182 |
| 2004/0111197 A1 | 6/2004 | Kipersztok et al. | |
| 2004/0176887 A1 | 9/2004 | Kent et al. | |
| 2004/0199307 A1 | 10/2004 | Kipersztok et al. | |
| 2008/0103645 A1 * | 5/2008 | DeMers et al. | 701/14 |
| 2008/0312783 A1 | 12/2008 | Mansouri et al. | |

OTHER PUBLICATIONS

English translation of Office Action dated Mar. 4, 2014, issued in Japanese Patent Application No. 2012-513656.

* cited by examiner

METHOD AND DEVICE FOR PROCESSING FAULTS

This invention relates to a method and a device for processing failures. It applies, in particular, to the processing of failures on board an airplane.

Failure detection systems on board an airplane monitor each other and also monitor other avionic systems that provide information items to them. In the course of this monitoring, the on-board failure detection systems send out signals representative of failures to a central maintenance system, also called "CMS" (acronym for "central maintenance system") that creates, for each flight, a list of all these failures, which list is called PFR (acronym for "Post Flight Report," for, in French, report subsequent to the flight).

The failures are associated with a category, according to their importance.

The failure lists, or PFRs, are used by the airline companies either by utilizing AIRMAN (registered trade name), a tool used on the ground and receiving in real time all the failures sent out by the airplane, or directly on the airplane at the end of the flight by looking at the PFR with the aid of the maintenance system (CMS) on the screens provided for this purpose in the cockpit.

There are more and more electronics in airplanes and therefore more and more failures and failure detection systems. On average today, on each flight, there are approximately 40 failures reported by the maintenance system. This number is too large to allow processing of all these failures during a stopover of the airplane, which sometimes lasts less than two hours.

In order to remedy these drawbacks, this invention is intended to extract or show the most pertinent failures that it would be necessary to repair as a priority before the airplane takes off again. Repairing of other failures then would be left to the discretion of the airline companies to be corrected, if necessary, during a somewhat longer stopover or during a scheduled maintenance operation.

To this end, this invention applies, according to a first aspect, to a device for processing failures, comprising means for detecting and identifying failures, characterized in that it further comprises, for at least a part of the identified failures:
  a means for storing a history of occurrences of failures having the same identification, in the course of a plurality of flights,
  a means for determining the impact of each identified failure on the availability of the airplane in a predetermined period,
  a means for associating a hierarchical attribute with each failure detected in the course of a flight, the said hierarchical attribute being dependent on the said history and the said impact and
  a means for displaying identified failures that are associated with a part of the said hierarchical attributes.

The individuals responsible for maintenance thus may be alerted to the presence of certain failures, among all the failures in the PFR that are shown, for example by display on a screen, highlighting with a bright color, addition of a label, or "tag." In this way, maintenance is optimized because the company identifies all the important failures to be processed during the stopover, which affords it a basic time savings.

According to specific characteristics, the device that is the object of this invention, such as briefly set forth above, further comprises a means for determining the status, ongoing or intermittent, of each identified failure, according to the history of the failure in the course of at least one preceding flight, the means for associating a hierarchical attribute with each failure detected in the course of a flight being adapted so that the said hierarchical attribute is dependent on the said status.

By virtue of these provisions, the intermittent failures, of lesser importance, may be separated from the ongoing failures and, consequently, the second better processed.

According to specific characteristics, the means for determining the status, ongoing or intermittent, of each identified failure, uses a category for each identified failure.

According to specific characteristics, the device that is the object of this invention further comprises a means for receiving a history of occurrence of a failure from a tool on the ground, the means for storing a history of occurrence of failures having the same identification storing the said history.

By virtue of these provisions, consultation of the hierarchically organized list of failures may be carried out from the central maintenance system of the airplane.

According to specific characteristics, the means for determining the impact of each identified failure on the availability of the airplane uses a category for each identified failure.

According to specific characteristics, the means for associating a hierarchical attribute with each failure detected in the course of a flight is adapted so that the said hierarchical attribute is representative of failures the impact of which grounds the airplane and the display means is adapted for displaying the said failures.

According to specific characteristics, the means for associating a hierarchical attribute with each failure detected in the course of a flight is adapted so that the said hierarchical attribute is representative of failures the impact of which would ground the airplane if their status became ongoing in a predetermined period.

In this way, mistaken failures, failures due to overly sensitive monitoring, intermittent failures or failures linked to particular airplane configurations (for example during start-up of the engines or electrical surges) or particular flight conditions are processed separately.

According to specific characteristics, the means for associating a hierarchical attribute with each failure detected in the course of a flight is adapted so that the said hierarchical attribute is representative of failures occurring in the course of at least a first predetermined number of flights, among a second predetermined number of previous flights made by the airplane, and the display means is adapted for displaying the said failures.

According to specific characteristics, the said first and/or second predetermined numbers are dependent on the identification of the failure.

According to specific characteristics, the means for associating a hierarchical attribute with each failure detected in the course of a flight is adapted so that the said hierarchical attribute is representative of failures capable, in combination with another failure not yet occurring, of grounding the airplane, and the display means is adapted for displaying the said failures.

According to specific characteristics, the means for associating a hierarchical attribute with each failure detected in the course of a flight is adapted so that the said hierarchical attribute is representative of failures capable of grounding the airplane after a predetermined number of flying hours, and the display means is adapted for displaying the said failures.

There are failures associated with a permission for continuation of flight limited in number of flying hours. When these failures are detected, the airplane is permitted to fly for 1000 hours, for example. By virtue of these provisions, it is possible to display a failure before the alarm indicating that the limited flight duration is reached (for example at 200 hrs.

from the end of the authorized flight duration) and in this way inform maintenance of the urgency of repairing this failure and thus avoid detaining the aircraft on the ground.

According to a second aspect, this invention applies to an airplane, characterized in that it comprises a device that is the object of this invention, such as briefly set forth above.

According to a third aspect, this invention applies to a system for processing failures, on the ground, characterized in that it comprises a device that is the object of this invention, such as briefly set forth above.

This invention applies, according to a fourth aspect, to a method for processing failures detected and identified by detection and identification means, characterized in that it comprises, for at least a part of the identified failures:
- a step of storing a history of occurrences of failures having the same identification, in the course of a plurality of flights,
- a step of determining the impact of each identified failure on the availability of the airplane in a predetermined period,
- a step of associating a hierarchical attribute with each failure detected in the course of a flight, the said hierarchical attribute being dependent on the said history and the said impact and
- a step of displaying identified failures that are associated with a part of the said hierarchical attributes.

Since the specific advantages, purposes and characteristics of this airplane, of this system on the ground and of this method are similar to those of the device that is the object of this invention, as briefly set forth above, they are not repeated here.

Figure 2:
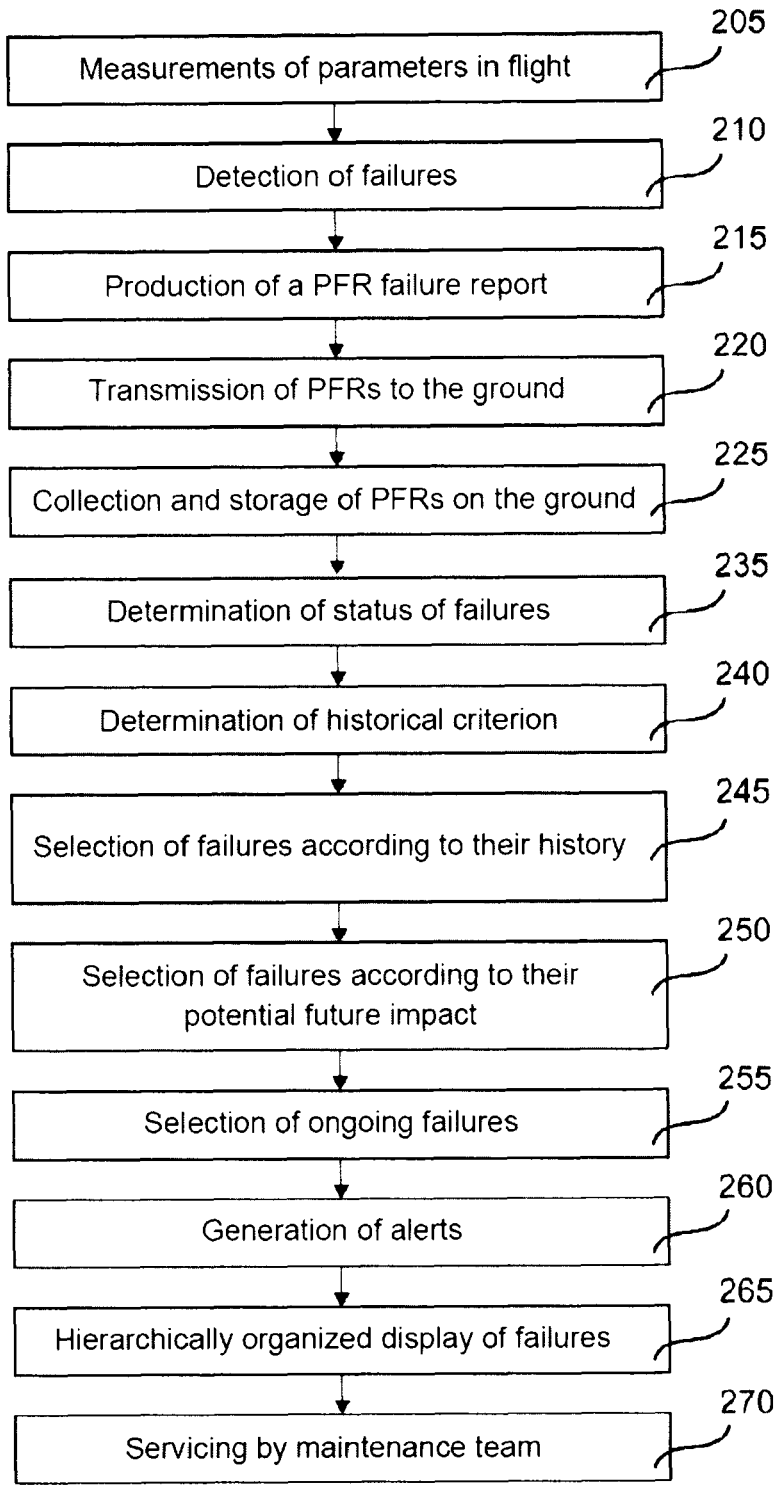

Other specific advantages, purposes and characteristics of this invention will become apparent from the description that is going to follow, presented with an explanatory and in no way limitative intent, with reference to the attached drawings, in which:

FIG. 1 schematically shows a specific embodiment of a device that is the object of this invention in an airplane that is the object of this invention, and communications with equipment items on the ground;

FIG. 2 schematically shows steps implemented in a specific embodiment of the method that is the object of this invention.

There is seen on FIG. 1 an airplane 105 carrying on board failure detection means 110, a central maintenance system 115, also called "CMS" (acronym for "central maintenance system") which creates, for each flight, a list of all these failures, which list is called PFR (acronym for "Post Flight Report," for, in French, report subsequent to the flight), and a transmitter-receiver 120 connected to central maintenance system 115.

Central maintenance system 115 comprises a central unit 125 and non-volatile memories 130.

On the ground, that is to say generally in an airport, a transmitter-receiver 135 communicates with transmitter-receiver 120 and with a data storage unit 140 and an AIRMAN tool 145.

Data storage unit 140 retains all the information items received from the airplanes from which it receives data. AIRMAN tool 145 makes it possible to determine the history of occurrence of a failure, in known manner.

Furthermore, the CMS sends to AIRMAN the identification of each failure, through transmitter-receivers 120 and 135, an information item representative of the occurrence of each failure, including its category, and the impact of each failure on the availability of the airplane over a given time horizon.

AIRMAN associates each failure with its history and sends back to the CMS the identification of each failure with its status, ongoing or intermittent, according to the duration of occurrence of the said failure and the history of each identified failure.

On the basis of the identification, including the category, the history, the impact and/or the status of each failure, the AIRMAN tool on the ground determines a hierarchical attribute for each identified failure, as set forth with reference to FIG. 2.

In a first embodiment, carried on board the airplane, non-volatile memories 130 retain a program that implements the steps of the method that is the object of this invention, for example the steps illustrated on FIG. 2, and central unit 125 uses the instructions of this program. Memories 130 and central unit 125 of central maintenance system 115 thus together constitute:
- a means for storing a history of occurrences of failures having the same identification, in the course of a plurality of flights,
- a means for determining the impact of each identified failure on the availability of the airplane in a predetermined (future) period,
- a means for associating a hierarchical attribute with each failure detected in the course of a flight, the said hierarchical attribute being dependent on the said history and the said impact and
- a means for displaying identified failures that are associated with a part of the said hierarchical attributes.

In a second embodiment, on the ground, the AIRMAN tool retains a program that implements the steps of the method that is the object of this invention, for example the steps illustrated on FIG. 2 and makes use of the instructions of this program. The AIRMAN tool thus constitutes:
- a means for storing a history of occurrences of failures having the same identification, in the course of a plurality of flights,
- a means for determining the impact of each identified failure on the availability of the airplane in a predetermined (future) period,
- a means for associating a hierarchical attribute with each failure detected in the course of a flight, the said hierarchical attribute being dependent on the said history and the said impact and
- a means for displaying identified failures that are associated with a part of the said hierarchical attributes.

During display of the list of failures, in the course of a stopover or at the request of a member of the crew, the list of failures shows the hierarchical attribute associated with the displayed failures. For example, only the failures associated with a hierarchical attribute greater than a predetermined value are displayed. According to another example, only a predetermined number of failures is displayed, according to a descending hierarchical attribute order.

In this way, the maintenance performed during the stopover is optimized because the airline company that operates the airplane identifies all the important failures to be repaired during the stopover, which affords it a basic time savings in relation to the PFRs of the prior art.

In other words, the implementation of this invention makes it possible, for example, to extract from the PFRs the important failures (according to their category) which have an ongoing status and which may detain the airplane on the ground immediately or the failures that could, in a few flying hours, detain the aircraft by adding the constraint that these failures have been present for several successive flights. This algorithm thus makes it possible to process separately the failures liable to be mistaken failures, failures due to overly sensitive monitoring, intermittent failures or failures linked to particular configurations of the airplane or particular flight conditions.

FIG. 2 details the steps performed in a specific embodiment of the method that is the object of this invention.

In the course of a step 205, the various sensors of the airplane measure parameters that are centralized in the on-board computers (not shown). In the course of a step 210, these on-board computers store the values of these parameters, process them for example by comparison with certain limit values and, through processing, detect failures. It is noted here that the term "failure" also covers operating anomalies.

The following four types of failures, valid for certain commercial airplanes, are identified in this way.

The first type of failure concerns failures said to be "with cockpit effect," which are failures generating an effect perceptible by the pilot in the cockpit: for example an ECAM (acronym for "Electronic Centralized Aircraft Monitor" for, in French, centralized electronic airplane monitoring) message from a computer that controls airplane functions. The ECAM message may represent three types of alarm (warning, caution, recommendation/advisory), a local alarm, a sound or a missing parameter ("XX") on one of the cockpit screens. These failures are often referred to as "category 1" or also "cockpit item."

The second type of failures concerns failures said to be "with cabin effect." It is a matter of any failure generating an effect in the cabin of the airplane but not having any consequence for safety, but only for the comfort of the passengers (for example, lavatories out of order). These failures often are referred to as "category 3" or "cabin item."

The third type of failures concerns failures that do not have any immediate effect but may have a longer-term effect:

any failure having neither a cockpit nor a cabin effect but which must be repaired within a prescribed time for safety reasons. These failures often are referred to as "category 4" (for example, linked to a low engine oil level).

any failure having neither a cockpit effect nor a cabin effect, without consequence for safety, without time limitation, but able to generate a cockpit effect or a cabin effect if it is combined with one or more other failures (for example, loss of redundancy of a switch ("switch") of an AFDX (acronym for Avionics Full DupleX" for, in French, full duplex avionics) network. These failures often are referred to as "category 5" or "pending items."

The fourth type of failures concerns failures without direct effect but able to act on the operating features of the airplane, or failures referred to as "minor." It is a matter of any failure having neither a cockpit effect nor a cabin effect, without consequence for safety, without time limitation, but having consequences for the operating features of the airplane, in particular consequences in terms of operating cost. These failures often are referred to as "category 6" or "Minor item."

In the course of a step 215, a PFR report, reverting to the list of detected failures, is produced by the computer (or central unit) of the centralized maintenance system CMS. In the course of a step 220, the PFR failure reports are transmitted to the ground during and after the flight. It is noted that certain failures also are presented to the pilot, for example alarms transmitted by the FWS (acronym for "Flight Warning System" or flight alarm system).

In the course of a step 225, the AIRMAN tool collects the PFR reports received in flight and on the ground from the airplane and stores them.

In accordance with this invention, in the course of a step 235, all the failures are identified and they are shown according to their history of appearance, their impact on the availability of the airplane in a predetermined (future) time interval.

To this end, in the course of step 235, a history specific to the airplane is used, in which all the failures occurring on previous flights are listed. When a given failure is identified by its code reappears, the tool registers it again with its code in association with the flight number as well as its date.

In the course of step 235, there is determined for each failure its status, ongoing or intermittent according to the history of the failures, for at least one prior flight.

In the course of a step 240, all the failures having appeared on the last x flights are researched, x being a predetermined number. This criterion is called criterion of appearance history on the last x flights. The tool stores the failures from previous flights and increments by one at each flight on which the failure is present.

In the course of a step 245, the faults are selected according to a criterion focusing on the history thereof. For ample, if the counter indicates a number of failures equivalent to the number x of flights, this failure is selected. In the same way, the number of failures present on x flights among the last y may be researched, y being a predetermined number greater than or equal to x.

In the course of a step 250, the failures that may detain the airplane in a given time horizon (even immediately) are selected.

In the course of a step 255, the failures having a status considered as ongoing (to distinguish them from the failures considered as intermittent) are selected.

For the practical implementation of steps 250 and 255, information items deriving directly from the maintenance system of the airplane and from the category of each failure message (1, 3, 5, 6) are used, as well as a correlation produced by the maintenance system with the generated cockpit effects (Warning, Caution, . . . ). This correlation is produced in essentially temporal manner.

More generally, the failures are selected according to all the criteria indicated above or any combination or juxtaposition of these criteria. There is understood by "combination" the fact of retaining only the failures that meet two or three of the criteria of steps 245 to 255 and by "juxtaposition" of retaining only the failures that meet one or the other of the criteria.

When a failure meets the formulation of the adopted criteria, in the course of a step 260 an alert is generated. According to one embodiment, only the failures selected in the list of failures occurring in the course of the flight are shown.

In this way the maintenance team knows that each failure displayed or shown is a true failure to be processed. The maintenance team thus may set up its action plan more rapidly.

As a variant, in the course of steps 245 to 255, the following failures are selected:

among the "cockpit items," the failures that are linked to an alarm or those that occurred in the course of the last five flights;

among the "cabin items," the failures that occurred in the course of the last five flights;

among the "pending items," the failures that are going to generate an alarm in fewer than 200 flying hours or those that, if they are combined with another failure, will set off an alarm, and which have occurred in the course of the last five flights and among the "minor items," those that have occurred during the last ten flights.

A further explanation concerning the "pending items" is provided below:

there are failures associated with a timer (flight duration measurement clock). When these failures are detected, the airplane has permission to fly for a predetermined period, for example 1000 hours. The "timer" counts down with the passing of flying hours logged by the airplane. When the "timer" reaches "0," a "Maintenance Time Limited" alarm is transmitted to the ECAM (acronym for "Electronic Centralized Aircraft Monitoring" for electronic centralized airplane monitoring) in the cockpit, and in this way the crew is warned that it no longer may fly until this failure is repaired (except under MEL, acronym for "Minimum Equipment List" or list of minimum equipment). The variant proposed here therefore may show the failure before the alarm appears (for example, when the timer shows 200 hours) and in this way warn maintenance about the urgency of repairing this failure and thus avoiding detaining the airplane on the ground.

there also are failures that set off an alarm only if another identified failure occurs simultaneously. In this case, as long as there is only one failure, the crew does not see any effect on its airplane. On the other hand, the airplane becomes somewhat more exposed to an alarm that could detain the airplane. By using variants of the invention, it is planned to repair the first failure in a reasonable period of time so as to reduce the risk of having both failures simultaneously and detaining the airplane because of the alarm that would result therefrom.

In the case of an access to the PFR from the AIRMAN tool, in the course of a step 265, this tool displays, in a screen dedicated to the airplane, the identification of the airplane concerned and the date of reception of the displayed information items. A specific tab makes it possible to display the hierarchically organized PFR, that is to say in which the selected failures are shown according to their hierarchical attribute.

In the case of an access to the PFR from the CMS, the same data are made available to the crew or to the maintenance team.

In the course of a step 270, the maintenance teams service the airplane after landing thereof or in the course of flight, to prepare for the maintenance actions to be carried out on the ground, once the airplane has arrived at its destination, using the specific tab of the tool on the ground described with reference to step 265.

As is understood on reading of the preceding description, the use of this invention alerts the individuals responsible for maintenance to the presence of certain failures. In this way certain failures are shown (displayed on screen, highlighted with a bright color, by addition of a tag, or label, . . . ) among the set of failures of the PFR. These failures are considered by the manufacturer or the operator of the airplane as important failures which should be processed by the maintenance team at the time of a stopover. This may be only an aid, because the policy of the airline companies concerning maintenance is very varied. In fact, for certain companies, it is necessary to correct only the failures grounding the airplane at the stopover, while for others, failures important for the comfort of the passengers are added thereto and, for still others, as many failures as possible must be processed.

The invention claimed is:

1. A device for processing failures, comprising: circuitry configured to
receive data regarding detected and identified failures in a course of a flight of an airplane;
store a history of occurrences of failures having a same identification, in a course of a plurality of flights;
for each identified failure, determine status, ongoing or intermittent, based on the identified failure and stored history of occurrences of failures having the same identification as the identified failure, in a course of at least one preceding flight of the plurality of flights;
determine an impact of each identified failure on availability of the airplane in a predetermined period based on the determined status;
associate a hierarchical attribute with each failure detected and identified in the course of the flight, the hierarchical attribute being dependent on the history of occurrences of failures and the determined impact on availability of the airplane in the predetermined period; and
cause display of identified failures that are associated with a part of the hierarchical attributes.

2. A device according to claim 1, wherein the circuitry, which is configured to determine the status, ongoing or intermittent, of each identified failure, uses a category of each identified failure message.

3. A device according to claim 1, wherein the circuitry is configured to receive a history of occurrence of a failure from a tool on the ground, and to store the history.

4. A device according to claim 1, wherein the circuitry, which is configured to determine the impact of each identified failure on the availability of the airplane in the predetermined period, uses a category for each identified failure.

5. A device according to claim 1, wherein the circuitry, which is configured to associate a hierarchical attribute with each failure detected in the course of the flight, is adapted so that the hierarchical attribute is representative of failures having an impact that grounds the airplane, and to cause display the failures having the impact that grounds the airplane.

6. A device according to claim 1, wherein the circuitry, which is configured to associate a hierarchical attribute with each failure detected in the course of the flight, is adapted so that the hierarchical attribute is representative of failures having an impact that would ground the airplane if their status became ongoing in the predetermined period.

7. A device according to claim 1, wherein the circuitry, which is configured to associate a hierarchical attribute with each failure detected in the course of a flight, is adapted so that the hierarchical attribute is representative of failures occurring in the course of at least a first predetermined number of flights, among a second predetermined number of flights made by the airplane, and to cause display the failures.

8. A device according to claim 7, wherein at least one of the first and second predetermined numbers are dependent on the identification of the failure.

9. A device according to claim 1, wherein the circuitry, which is configured to associate a hierarchical attribute with each failure detected in the course of the flight, is adapted so that the hierarchical attribute is representative of failures capable, in combination with another failure not yet occurring, of grounding the airplane, and to cause display the failures.

10. A device according to claim 1, wherein the circuitry, which is configured to associate a hierarchical attribute with each failure detected in the course of a flight, is adapted so that the hierarchical attribute is representative of failures capable of grounding the airplane after a predetermined number of flying hours, and to cause display the failures.

11. An airplane, comprising the device according to claim 1.

12. A system for processing failures on the ground, comprising the device according to claim 1.

13. A method for processing failures detected and identified, the method comprising:
- receiving, using a processor, data regarding detected and identified failures in a course of a flight of an airplane;
- storing, using the processor, a history of occurrences of failures having a same identification, in a course of a plurality of flights;
- for each identified failure, determine status, ongoing or intermittent, using the processor, based on the identified failure and stored history of occurrences of failures having the same identification as the identified failure, in a course of at least one preceding flight of the plurality of flights;
- determining, using the processor, an impact of each identified failure on availability of the airplane in a predetermined period based on the determined status;
- associating, using the processor, a hierarchical attribute with each failure detected and identified in the course of the flight, the hierarchical attribute being dependent on the history of occurrences of failures and the determined impact on availability of the airplane in the predetermined period; and
- displaying identified failures that are associated with a part of the hierarchical attributes.

\* \* \* \* \*